United States Patent
Hooli et al.

(10) Patent No.: US 10,784,996 B2
(45) Date of Patent: Sep. 22, 2020

(54) HARQ FEEDBACK ON GRANT-LESS UL

(71) Applicant: Nokia Technologies Oy, Espoo (FI)

(72) Inventors: Kari Hooli, Oulu (FI); Timo Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/475,437

(22) PCT Filed: Dec. 13, 2017

(86) PCT No.: PCT/FI2017/050883
§ 371 (c)(1),
(2) Date: Jul. 2, 2019

(87) PCT Pub. No.: WO2018/130740
PCT Pub. Date: Jul. 19, 2018

(65) Prior Publication Data
US 2020/0213043 A1  Jul. 2, 2020

Related U.S. Application Data

(60) Provisional application No. 62/446,710, filed on Jan. 16, 2017.

(51) Int. Cl.
*H04L 1/18* (2006.01)
*H04L 5/00* (2006.01)
*H04W 72/12* (2009.01)

(52) U.S. Cl.
CPC .......... *H04L 1/1819* (2013.01); *H04L 1/1896* (2013.01); *H04L 5/0055* (2013.01); *H04W 72/1268* (2013.01)

(58) Field of Classification Search
CPC ... H04L 1/1819; H04L 1/1896; H04L 5/0055; H04W 72/1268
(Continued)

(56) References Cited

U.S. PATENT DOCUMENTS

| 2012/0327821 A1 | 12/2012 | Lin et al. |
| 2014/0362832 A1 | 12/2014 | Rudolf et al. |

(Continued)

FOREIGN PATENT DOCUMENTS

| WO | 2016/123402 A1 | 8/2016 |
| WO | 2016/167828 A1 | 10/2016 |
| WO | 2016/182533 A1 | 11/2016 |

OTHER PUBLICATIONS

"New Work Item on Enhancements to LTE Operation in Unlicensed Spectrum", 3GPP TSG-RAN meeting #74, RP-162228, Agenda Item: 10.1.1, Ericsson, Dec. 5-8, 2016, 9 pages.
(Continued)

*Primary Examiner* — Obaidul Huq
(74) *Attorney, Agent, or Firm* — Nokia Technologies Oy

(57) ABSTRACT

In accordance with an example embodiment of the present invention, a method, comprising receiving, by a user equipment, information for configuration with Grant-less Uplink Physical Uplink Shared Channel (GUL PUSCH) resources; attempting to transmit, by the user equipment, Hybrid Automatic Repeat Request (HARQ) feedback on at least one resources; performing a channel access procedure for transmitting Hybrid Automatic Repeat Request Acknowledgement (HARQ-ACK) on the GUL PUSCH resources in response to a determination that the attempting to transmit the HARQ feedback on the at least one resources is unsuccessful; and transmitting HARQ-ACK on the GUL PUSCH resources in response to successfully completing the channel access procedure, is disclosed.

18 Claims, 5 Drawing Sheets

(58) Field of Classification Search
USPC .................................... 370/310, 328, 329
See application file for complete search history.

(56) References Cited

U.S. PATENT DOCUMENTS

| | | |
|---|---|---|
| 2016/0352454 A1 | 12/2016 | Zhang et al. |
| 2018/0146480 A1* | 5/2018 | Chendamarai Kannan ................. H04W 72/1268 |
| 2018/0167161 A1* | 6/2018 | Davydov .............. H04L 1/0011 |
| 2019/0174472 A1* | 6/2019 | Lee ....................... H04L 1/1864 |
| 2020/0187228 A1* | 6/2020 | Cheng ............... H04W 72/1289 |

OTHER PUBLICATIONS

"3rd Generation Partnership Project; Technical Specification Group Radio Access Network; Evolved Universal Terrestrial Radio Access (E-UTRA); Physical layer procedures (Release 14)", 3GPP TS 36.213, V14.1.0, Dec. 2016, pp. 1-414.

International Search Report and Written Opinion received for corresponding Patent Cooperation Treaty Application No. PCT/FI2017/050883, dated Apr. 5, 2018, 18 pages.

\* cited by examiner

HARQ FEEDBACK ON GRANT-LESS UL

RELATED APPLICATION

This application was originally filed as Patent Cooperation Treaty Application No. PCT/FI2017/050883 filed Dec. 13, 2017 which claims priority benefit to U.S. Provisional Patent Application No. 62/446,710, filed Jan. 16, 2017.

TECHNICAL FIELD

The teachings in accordance with the exemplary embodiments of this invention relate generally to transmission of Uplink (UL) control information (UCI) and, in particular, Hybrid Automatic Repeat Request (HARQ) feedback on unlicensed spectrum subject to Listen-Before-Talk rules.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Transmission of UCI, in particular HARQ feedback, on unlicensed spectrum is subject to Listen-Before-Talk rules. Long term evolution (LTE) standalone operation on unlicensed spectrum means that eNodeB/user equipment (eNB/UE) air interfaces rely solely on unlicensed spectrum without any carrier on licensed spectrum. LTE-based technology supporting network's stand-alone operation on unlicensed carriers is currently developed by MulteFire Alliance.

MulteFire Rel.1.1 (MulteFire release 1.1) considers a set of features enhancing the basic MulteFire operation specified in Rel. 1.0. One such feature is grant-less uplink (GUL), also known as autonomous Physical Uplink Shared Channel (PUSCH), in which the UE is allowed to transmit UL on preconfigured resources without having to receive a separate explicit UL grant for each transmission. The same feature is also being proposed in the 3rd Generation Partnership Project (3GPP) as a part work Rel-15 Item for Licensed Assisted Access (LAA) enhancements.

Certain abbreviations that may be found in the description and/or in the Figures are herewith defined as follows:
ACK Acknowledgement
CCA Clear Channel Assessment
DL Downlink
DM-RS Demodulation Reference Signal
eNB Enhanced Node B
GUL Grant-less Uplink
HARQ Hybrid Automatic Repeat Request
HARQ-ACK Hybrid Automatic Repeat Request Acknowledgement
I/F interface
LAA Licensed Assisted Access
LBT Listen Before Talk
LTE long term evolution
MCOT Maximum Channel Occupancy Time
MF MulteFire
MFA MulteFire Alliance
MF-ePUCCH MulteFire extended PUCCH
MF-sPUCCH MulteFire short PUCCH
MME mobility management entity
NCE network control element
N/W network
PDCCH Physical Downlink Control Channel
PDSCH Physical Downlink Shared Channel
PUCCH Physical Uplink Control Channel
PUSCH Physical Uplink Shared Channel
RRC Radio Resource Control
RRH remote radio head
Rx receiver
SGW serving gateway
SPS Semi-Persistent Scheduling
TB Transport Block
Tx transmitter
TXOP Tranmission Opportunity
UCI Uplink Control Information
UE User Equipment
UL Uplink
UL SCH Uplink Shared Channel

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In the example embodiments as described herein a novel method and apparatus is proposed to implement a set of rules defining when a UE configured with GUL PUSCH resources may transmit HARQ-ACK feedback on GUL PUSCH.

Figure 1:
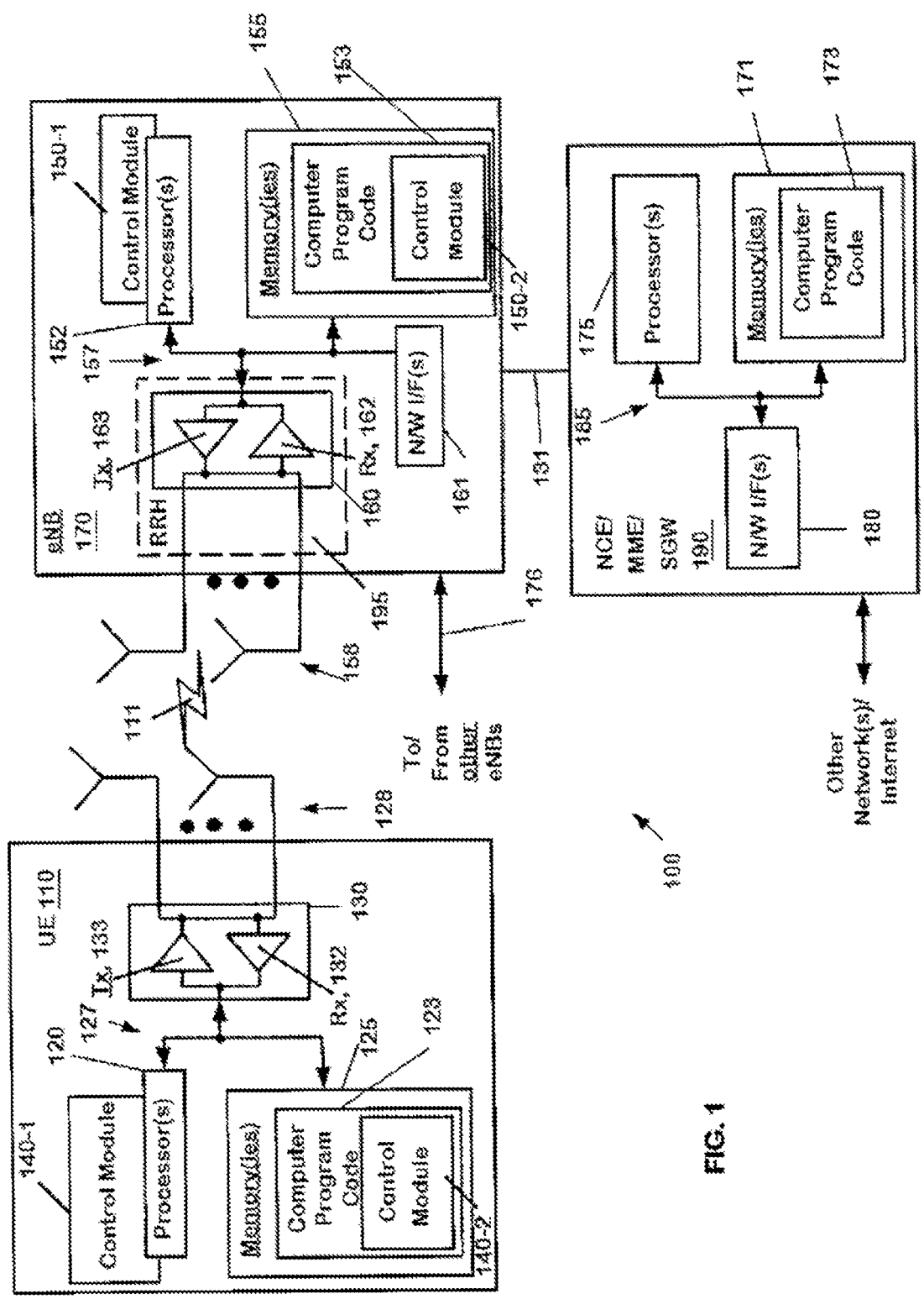
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity. GUL transmission may reduce latency related to UL transmissions. Latency becomes an issue in particular when operating on unlicensed spectrum since each channel access procedure may delay channel access for an extended period of time. On the other hand, increased latency may reduce effective throughput or compromise air interface support for applications having strict latency requirements.

In addition to latency effects, GUL transmission may increase channel access probability for LTE-based UL 210 when contending for channel with another radio access technology such as Wi-Fi. The example embodiments relate to MulteFire Rel. 1.1 as well as 3GPP LTE Licensed Assisted Access enhancements and in particular support for autonomous LAA uplink transmissions, as well as to standalone operation on unlicensed carriers.

In MF Rel.1.0 and Rel-14 LAA, UL data transmission requires two successful channel access procedures, also referred to as CCA or LBT procedures. In a channel access procedure, eNB 170 or UE 110 assesses or senses whether channel is vacant or idle for transmission by performing measurements on channel according the procedure. If channel is assessed to be vacant, eNB 170 or UE 110 starts transmissions; if not, eNB 170 or UE 110 continues assessing the channel vacancy; or re-tries channel access at a later time; or discards the transmission. There is a first CCA procedure by the eNB 170 to acquire channel access to transmit UL scheduling grant and another CCA by the UE 110 immediately before transmitting the PUSCH. These two CCA procedures occur in different locations and time instances, requiring larger "vacant" area as well as portion of time than single CCA procedure occurring in UE 110. Further, a scheduled UE 110 can start UL transmission only at one time instant, making the UE 110 lose the channel contention for a time agile system such as Wi-Fi more frequently than necessary or fair. To alleviate the problem, GUL PUSCH is specified for MF Rel 1.1 and is also proposed as a part of 3GPP Rel-15 LAA enhancements.

With GUL, the basic idea is that UL resources are granted for the UE 110 on a long term basis, using e.g. RRC configuration, or SPS involving, for example, RRC configuration and MAC activation/deactivation. This allows the UE 110 to get its UL signals transmitted without a need for both the eNB 170 and UE 110 to clear the CCA.

GUL resources may in occur either within an eNB acquired TXOP or in a separate UE-specific TXOP. TXOP or transmission opportunity is the maximum time that eNB 170 or UE 110 can transmit continuously on the channel after acquiring channel access, for example, by running CCA procedure indicating channel to be idle and starting transmission on the channel. The type of the CCA procedure that the UE 110 must apply may depend on the type of the TXOP. In the case of eNB acquired TXOP, the eNB 170 may perform appropriate channel contention and the UE 110 may apply simple one-shot CCA procedure, for example, such as Type 2 UL channel access procedure defined in 3GPP TS36.213, to check the vacancy of channel. In the case of UE-specific TXOP, the UE 110 may perform CCA procedure with appropriate channel contention, for example, such as Type 1 UL channel access procedure defined in 3GPP TS36.213. eNB 170 may signal the ending time or subframe of eNB acquired TXOP to the UE 110 as part of DL transmission as, for example, common downlink control information for the determination of TXOP or CCA procedure type. eNB 170 may alternatively signal the type of CCA procedure that the UE must apply for certain subframe, corresponding to the TXOP type of the subframe. Furthermore, the GUL resources may be configured separately for each of the two TXOP types.

In MF1.0, UE transmits HARQ-ACK for PDSCH transport blocks either on MF-sPUCCH, on eNB scheduled PUSCH or on MF-ePUCCH. In the situation in which the UE 110 transmits HARQ-ACK for PDSCH transport blocks, UE's 110 CCA procedure may fail and prevent transmission when the UE 110 was expected to transmit HARQ feedback. MF1.0 includes mechanisms for transmitting HARQ-ACK later on, but these will introduce delay for HARQ feedback and require yet another successful CCA procedure from both the eNB 170 and the UE 110.

There may be situations where a nearby competing node causes UE's 110 CCA to fail frequently while at the eNB 170 end the interference from the competing node is not detected. Consequently, the eNB 170 may have more successful channel contentions than the UE 110 and can transmit the PDSCH TBs without disruptions, while UEs 110 HARQ-ACK feedback may succeed infrequently (such as every now and then). In those situations eNB 170 can transmit PDSCH for all HARQ processes for which eNB 170 has up-to-date HARQ feedback available, but needs to suspend transmissions to the UE 110 for some HARQ processes due to lack of timely HARQ feedback. This may result in degradation of DL throughput towards the UE 110, even if the eNB 170 could access the channel all or most of the time.

Figure 2:
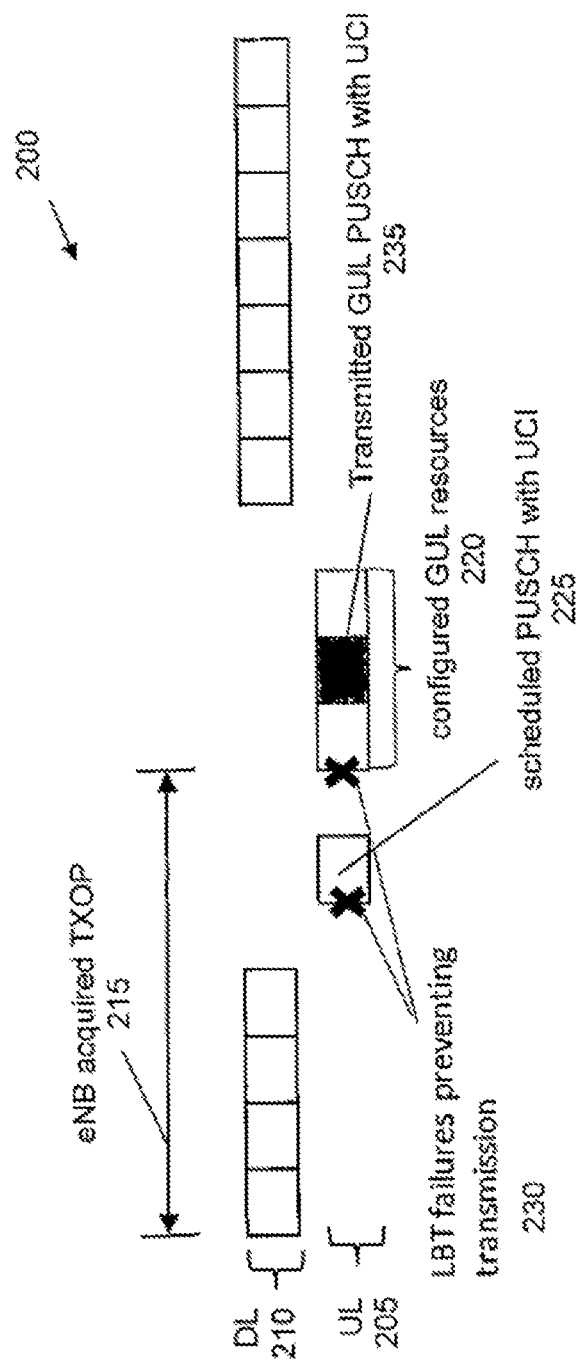
FIG. 2 shows an illustration of transmission of HARQ-ACK on GUL after UE's CCA procedure has blocked UE's transmission on the resources scheduled by eNB for HARQ feedback transmission.
Figure 3:
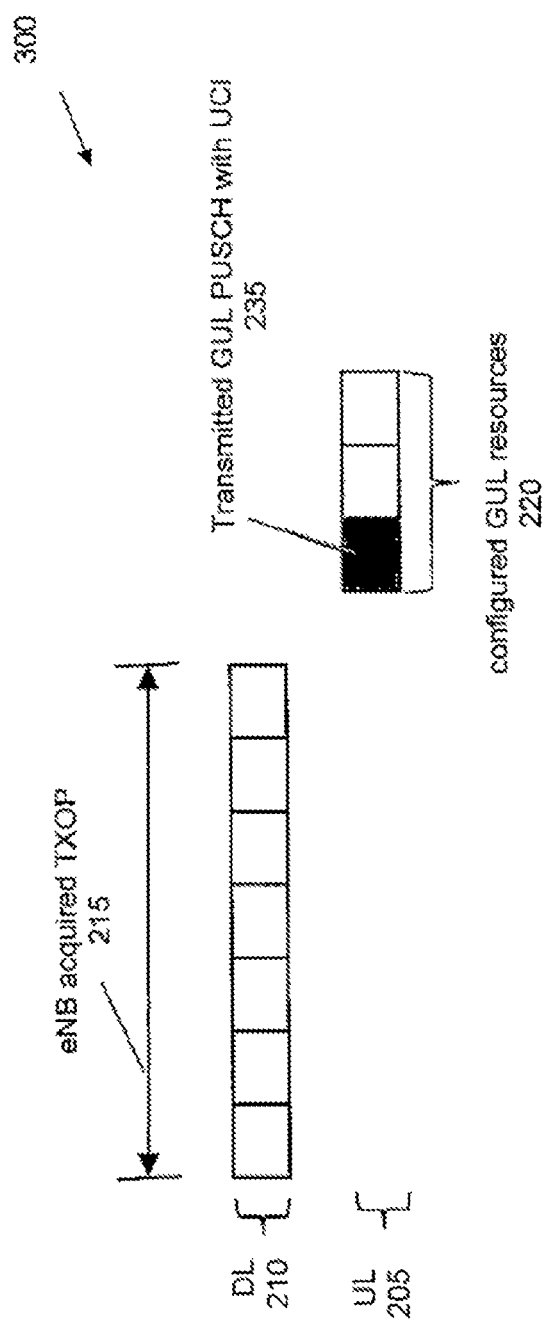
FIG. 3 shows an illustration of transmission of HARQ-ACK on GUL when eNB has not indicated any resources for HARQ feedback transmission.

Referring now to FIGS. 2 and 3, example embodiments 200 and 300 may enhance HARQ feedback transmission by using GUL PUSCH for HARQ feedback in addition to the CCA procedure to transmit HARQ feedback. The embodiments 200, 300 include a set of rules defining when a UE 110 configured with GUL PUSCH resources 220 is to transmit HARQ-ACK feedback on GUL PUSCH 235. In the situation in which the UE 110 transmits HARQ-ACK for PDSCH transport blocks, a UE 110, such as shown above in FIG. 1, may transmit GUL transmissions as well as scheduled PUSCH transmission. Additionally, both transmissions may be affected by uncertain channel access. The embodiments include a set of rules defining when UE 110 is to transmit HARQ-ACK on GUL PUSCH 235 or when to transmit HARQ-ACK on scheduled PUSCH 225.

According to an embodiment, a UE 110 may be configured with GUL PUSCH resources 220. Additionally an eNB 170 may schedule regular PUSCH resources 225 for the UE 110. When HARQ feedback is required, the UE 110 may first attempt to transmit HARQ feedback according to MF1.0, either on implicitly scheduled MF-sPUCCH resources or on explicitly scheduled MF-ePUCCH or PUSCH resources according to MF1.0. Implicitly scheduled MF-sPUCCH resources means the MF-sPUCCH resources that UE 110 can determine based on the content and timing of DL control information used for scheduling PDSCH as well as for indicating presence and timing of MF-sPUCCH. In other words, scheduled (non-GUL) resources 225 are preferred as primary option for HARQ feedback transmission as potential collision on GUL PUSCH will likely corrupt HARQ feedback content and, hence, trigger retransmission of corresponding PDSCHs.

UE 110 may attempt to transmit GUL PUSCH, that is, may run LBT procedure for GUL PUSCH and transmit if LBT procedure (or CCA procedure) is successful. Embodiments may determine when the UE 110 is to attempt to transmit HARQ-ACK on GUL PUSCH and transmit if LBT procedure (or CCA procedure) is successful based on scenarios as shown in FIGS. 2 and 3.

Referring to FIG. 2 an example embodiment 200 is shown of transmission of HARQ-ACK on GUL on UL 205 after UE's 110 CCA procedure has blocked UE's 110 transmission on the resources scheduled by eNB 170 for HARQ feedback transmission. LBT failures may prevent transmission 230.

After UE's 110 CCA procedure has blocked UE's 110 transmission on the resources (implicitly or explicitly) scheduled by eNB 170 for HARQ feedback transmission (such as, for example, MF-sPUCCH, MF-ePUCCH or dynamically scheduled PUSCH carrying UCI) the UE 110 may attempt to transmit HARQ-ACK on GUL PUSCH 235. In the case of 2-stage scheduling, where eNB sends UL grant containing resource allocation in stage 1 and separately triggers the transmission at a later stage 2, only PUSCH resources that are also triggered to be transmitted may be considered for transmission of HARQ feedback.

In a particular embodiment with respect to FIG. 2, the rule may be further limited so that if UE's 110 CCA blocks UE transmission on the resources scheduled for HARQ feedback, the UE 110 is to attempt to transmit HARQ feedback on GUL PUSCH only within the same eNB-acquired TXOP 215.

Referring to FIG. 3 an example embodiment 300 is shown of transmission of HARQ-ACK on GUL when eNB 170 has not indicated any control channel resources or scheduled resources for HARQ feedback transmission is shown.

The UE 110 may attempt to transmit HARQ-ACK on GUL PUSCH 235 in instances in which the eNB 170 has not indicated any resources for HARQ feedback transmission. This case may occur when eNB indicates via Common DCI that eNB-acquired TXOP 215 is used only for DL 210 transmission and UE 110 does not receive any UL 205 grant for HARQ feedback transmission. In one embodiment, this rule may be further limited so that UE 110 is to attempt to transmit HARQ feedback on GUL PUSCH if eNB 170 has not indicated any resources for HARQ feedback transmission within the eNB-acquired TXOP 215.

For both instances, as described in FIGS. 2 and 3, UE 110 is to stop trying to transmit HARQ feedback on GUL PUSCH when UE 110 detects the start of the next DL 210 burst, or UE 110 has transmitted same HARQ feedback on GUL PUSCH resources 220 a predefined number of times (such as 1 or more). By repeating transmissions the potential collision impact is mitigated.

Configuration eNB 170 may configure HARQ feedback transmission on GUL PUSCH as part of GUL PUSCH resource configuration. There may be separate configurations to be used when GUL resources occur within the eNB-acquired TXOP 215, and when GUL resources occur outside of an eNB-acquired TXOP 215. The configuration may include, for example, time domain resources (candidate GUL subframes), frequency domain resources (interlace used for transmission), and code domain resources (e.g. UL DMRS cyclic shift, orthogonal cover code, etc.).

HARQ Feedback Content

UE 110 may transmit the same HARQ feedback content on GUL PUSCH as it would transmit on the scheduled resource on the same subframe (i.e. on ePUCCH or on PUSCH). In other words, UE 110 may use the same HARQ feedback content determination mechanism regardless whether the attempted transmission occurs on the GUL PUSCH resource or on the explicitly scheduled PUSCH or ePUCCH resource. Alternatively, if the UE 110 has multiple consecutive GUL PUSCH subframes configured, the UE 110 may transmit the HARQ feedback content determined for the first GUL PUSCH subframe. In this manner, the UE 110 may avoid having to repeatedly update and re-build GUL PUSCH content if a first GUL PUSCH transmission is blocked by LBT failures 230.

UE 110 reports on GUL PUSCH HARQ-ACK feedback that is determined based on HARQ-ACK for all configured HARQ processes, as is done in MF1.0. Alternatively, UE 110 may report HARQ-ACK corresponding to those PDSCH(s) that eNB 170 had transmitted during a predetermined time window preceding the HARQ feedback transmission.

HARQ Feedback and UL-SCH Multiplexing

According to one example embodiment, GUL PUSCH 235 may contain either HARQ feedback or UL SCH but not both. In other words, when UE 110 transmits HARQ feedback, the HARQ feedback does not include UL-SCH for GUL PUSCH 235 transmission. In another example embodiment, HARQ feedback may be punctured to PUSCH, for example, according to the LTE rules. In yet another example embodiment, HARQ feedback and UL-SCH may be multiplexed, for example according to the MF1.0 rules.

In an alternative embodiment, the UE 110 may also utilize ePUCCH format for transmitting HARQ-ACK feedback (for example, without simultaneous PUSCH data) in a GUL sub-frame.

Figure 4:
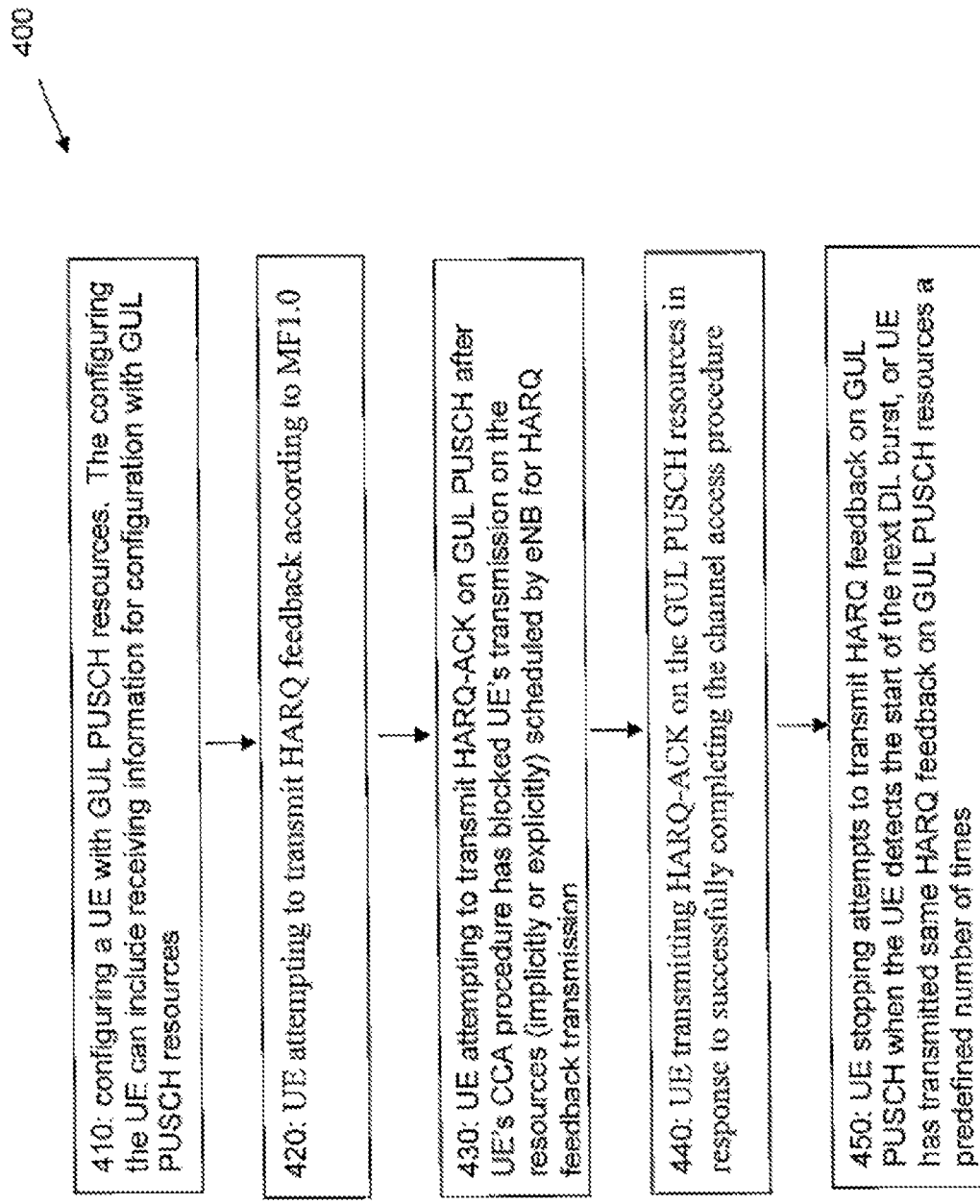
FIG. 4 shows a method in accordance with example embodiments which may be performed by an apparatus.

Referring to FIG. 4 an example method for transmission of HARQ-ACK on GUL after UE's 110 CCA procedure has blocked UE's 110 transmission on the resources scheduled by eNB 170 for HARQ feedback transmission is shown.

The method may include configuring a UE 110 with GUL PUSCH resources 220 (block 410). The configuring the UE 110 may include the UE 110 receiving information for configuration with GUL PUSCH resources 220. Additionally an eNB 170 may schedule regular PUSCH resources for the UE 110.

The method may include the UE 110 attempting to transmit HARQ feedback according to MF1.0, either on implicitly scheduled MF-sPUCCH resources or on explicitly scheduled MF-ePUCCH or PUSCH resources according to MF1.0 (block 420).

The method may include the UE 110 attempting to transmit HARQ-ACK on GUL PUSCH 235 after UE's 110 CCA procedure has blocked UE's 110 transmission on the resources (implicitly or explicitly) scheduled by eNB 170 for HARQ feedback transmission (such as, for example, MF-sPUCCH, MF-ePUCCH or dynamically scheduled PUSCH carrying UCI) (block 430). In the case of 2-stage scheduling, only PUSCH resources that are also triggered may be considered for transmission of HARQ feedback.

The method may include the UE 110 transmitting HARQ-ACK on the GUL PUSCH resources in response to successfully completing the channel access procedure (block 440).

The method may include the UE 110 stopping attempts to transmit HARQ feedback on GUL PUSCH when the UE 110 detects the start of the next DL 210 burst, or UE 110 has transmitted same HARQ feedback on GUL PUSCH resources 220 a predefined number of times (such as 1 or more) (block 450).

Figure 5:
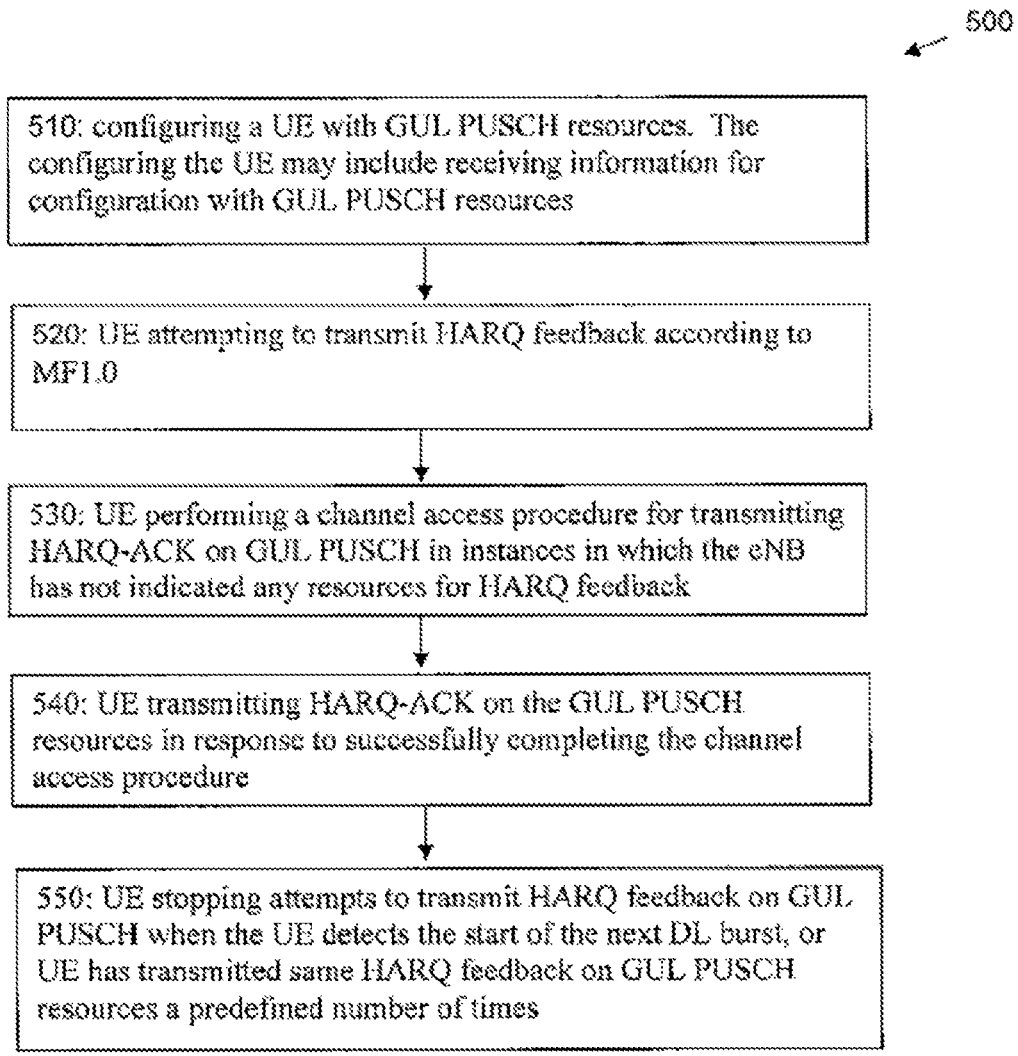
FIG. 5 shows a method in accordance with example embodiments which may be performed by an apparatus.

Referring to FIG. 5 an example method for transmission of HARQ-ACK on GUL when eNB 170 has not indicated any resources for HARQ feedback transmission.

The method may include configuring a UE 110 with GUL PUSCH resources 220 (block 510). Additionally an eNB 170 may schedule regular PUSCH resources for the UE 110.

The method may include the UE 110 attempting to transmit HARQ feedback according to MF1.0, either on implicitly scheduled MF-sPUCCH resources or on explicitly scheduled MF-ePUCCH or PUSCH resources according to MF1.0 (block 520).

The UE 110 may attempt to transmit HARQ-ACK on GUL PUSCH 235 in instances in which the eNB 170 has not indicated any resources for HARQ feedback transmission (block 530). This case may occur when eNB 170 indicates via Common DCI that eNB-acquired TXOP 215 is used only for DL 210 transmission and UE 110 does not receive any UL 205 grant for HARQ feedback transmission.

According to one example embodiment, this rule may be further limited so that UE 110 is to attempt to transmit HARQ feedback on GUL PUSCH 235 if eNB 170 has not indicated any resources for HARQ feedback transmission within the eNB-acquired TXOP 215.

The UE 110 may transmit HARQ-ACK on the GUL PUSCH resources in response to successfully completing the channel access procedure (block 540).

The method may include the UE 110 stopping attempts to transmit HARQ feedback on GUL PUSCH 235 when the UE 110 detects the start of the next DL 210 burst, or UE 110 has transmitted the same HARQ feedback on GUL PUSCH 220 resources a predefined number of times (such as 1 or more) (block 550).

Without in any way limiting the scope, interpretation, or application of the claims appearing below, a technical effect of one or more of the example embodiments disclosed herein is prevent unnecessary suspending of DL transmissions due to lack of timely feedback and thereby improving DL 210 throughput in presence of high channel occupancy. Another technical effect of one or more of the example embodiments disclosed herein is providing a repetition mechanism for HARQ feedback. The same HARQ feedback may be transmitted via PUSCH scheduled outside eNB-acquired TXOP 215 and via GUL PUSCH 235. Another technical effect of one or more of the example embodiments disclosed herein is provide a fall-back mechanism when LBT failures 230 prevent HARQ feedback transmission via regular scheduled UL resources (PUSCH, MF-sPUCCH or MF-ePUCCH).

An example embodiment may be provided in an apparatus comprising at least one processor; and at least one non-transitory memory including computer program code, the at least one memory and the computer program code may be configured to, with the at least one processor, cause the apparatus to: configure a UE 110 with GUL PUSCH resources 220, attempt, by the UE 110, to transmit HARQ feedback according to MF1.0, either on implicitly scheduled MF-sPUCCH resources or on explicitly scheduled MF-ePUCCH or PUSCH resources according to MF1.0, attempt to transmit HARQ-ACK on GUL PUSCH 235, and stop attempts to transmit HARQ feedback on GUL PUSCH 235 when the UE 110 detects the start of the next DL 210 burst, or UE 110 has transmitted the same HARQ feedback on GUL PUSCH 220 resources a predefined number of times.

In accordance with the example embodiments as described in the paragraphs above, wherein the at least one memory and the computer program code may be configured to, with the at least one processor, cause the apparatus to attempt to transmit HARQ-ACK on GUL PUSCH 235 after UE's 110 CCA procedure has blocked UE's 110 transmission on the resources (implicitly or explicitly) scheduled by eNB 170 for HARQ feedback transmission.

In accordance with the example embodiments as described in the paragraphs above, wherein the at least one memory and the computer program code may be configured to, with the at least one processor, cause the apparatus to attempt to transmit HARQ-ACK on GUL PUSCH 235 in instances in which the eNB 170 has not indicated any resources for HARQ feedback transmission.

In accordance with the example embodiments as described in the paragraphs above, an eNB 170 may schedule regular PUSCH resources for the UE 110.

In accordance with the example embodiments as described in the paragraphs above, wherein, when attempting to transmit HARQ feedback according to MF1.0, the at least one memory and the computer program code may be configured to, with the at least one processor, cause the apparatus to attempt to transmit HARQ feedback either on implicitly scheduled MF-sPUCCH resources or on explicitly scheduled MF-ePUCCH or PUSCH resources according to MF1.0.

In accordance with the example embodiments as described in the paragraphs above, wherein, in the case of 2-stage scheduling, only PUSCH resources that are also triggered may be considered for transmission of HARQ feedback.

In accordance with the example embodiments as described in the paragraphs above, wherein, when configuring the UE 110 with GUL PUSCH resources 220, the at least one memory and the computer program code may be configured to, with the at least one processor, cause the apparatus to configure at least one of time domain resources, frequency domain resources, and code domain resources.

In accordance with the example embodiments as described in the paragraphs above, wherein, when attempting to transmit HARQ feedback, the at least one memory and the computer program code may be configured to, with the at least one processor, cause the apparatus to transmit the same HARQ feedback content on GUL PUSCH as the UE 110 would transmit on the scheduled resource on the same subframe.

In accordance with the example embodiments as described in the paragraphs above, wherein GUL PUSCH 235 may contain either HARQ feedback or UL SCH but not both.

In accordance with the example embodiments as described in the paragraphs above, a method, comprising receiving, by a user equipment, information for configuration with Grant-less Uplink Physical Uplink Shared Channel (GUL PUSCH) resources, attempting to transmit, by the user equipment, Hybrid Automatic Repeat Request (HARQ) feedback on at least one resources, performing a channel access procedure for transmitting Hybrid Automatic Repeat Request Acknowledgement (HARQ-ACK) on the GUL PUSCH resources in response to a determination that the attempting to transmit the HARQ feedback on the at least resources is unsuccessful, and transmitting HARQ-ACK on the GUL PUSCH resources in response to successfully completing the channel access procedure.

In accordance with the example embodiments as described in the paragraphs above, wherein performing the channel access procedure for transmitting the HARQ-ACK on the GUL PUSCH resources further comprises performing the channel access procedure for transmitting the HARQ-ACK on the GUL PUSCH resources after the channel access procedure of the user equipment has blocked transmission of the HARQ feedback on the at least one resources.

In accordance with the example embodiments as described in the paragraphs above, wherein attempting to transmit HARQ feedback, further comprises determining whether an Enhanced Node B has triggered transmission of the explicitly scheduled PUSCH resources, and only selecting the explicitly scheduled PUSCH resources for transmission of HARQ feedback in response to a determination that the Enhanced Node B has triggered transmission of the explicitly scheduled PUSCH resources.

In accordance with the example embodiments as described in the paragraphs above, wherein performing the channel access procedure for transmitting the HARQ-ACK on the GUL PUSCH resources further comprises performing the channel access procedure for transmitting the HARQ-ACK on the GUL PUSCH resources only within a same eNB-acquired transmission opportunity (TXOP) within which the channel access procedure of the user equipment has blocked transmission on the at least one resources.

In accordance with the example embodiments as described in the paragraphs above, wherein performing the channel access procedure for transmitting the HARQ-ACK on the GUL PUSCH resources further comprises performing the channel access procedure for transmitting the HARQ-ACK on the GUL PUSCH resources in response to a determination that an Enhanced Node B (eNB) has not indicated the at least one resources for HARQ feedback transmission.

In accordance with the example embodiments as described in the paragraphs above, wherein performing the channel access procedure for transmitting the HARQ-ACK on the GUL PUSCH resources further comprises performing the channel access procedure for transmitting the HARQ-ACK on the GUL PUSCH resources only if the eNB has not indicated the at least one resources for HARQ feedback transmission within the eNB-acquired TXOP.

In accordance with the example embodiments as described in the paragraphs above, wherein receiving the information for configuration with the GUL PUSCH resources further comprises receiving the information for configuration of at least one of time domain resources, frequency domain resources, and code domain resources.

In accordance with the example embodiments as described in the paragraphs above, wherein performing the channel access procedure for transmitting the HARQ-ACK on the GUL PUSCH resources further comprises using a same HARQ feedback content determination mechanism regardless of whether the attempted transmission occurs on the GUL PUSCH resource or on the at least one resources.

In accordance with the example embodiments as described in the paragraphs above, wherein performing the channel access procedure for transmitting the HARQ-ACK on the GUL PUSCH resources further comprises performing the channel access procedure for transmitting HARQ feedback content determined for a first GUL PUSCH subframe if the user equipment has multiple consecutive GUL PUSCH subframes configured.

In accordance with the example embodiments as described in the paragraphs above, further comprising ending performances of the channel access procedure for transmitting the HARQ-ACK on the GUL PUSCH resources in response to a determination that user equipment has at least one of detected a start of a Downlink burst, and transmitted the HARQ feedback on the GUL PUSCH resources a predefined number of times.

In accordance with the example embodiments as described in the paragraphs above, wherein the at least one resources comprises at least one of implicitly scheduled MulteFire short Physical Uplink Control Channel (MF-sPUCCH) resources, explicitly scheduled MulteFire extended PUCCH (MF-ePUCCH) and explicitly scheduled PUSCH resources.

In accordance with the example embodiments as described in the paragraphs above, an apparatus, comprising at least one processor, and at least one memory including computer program code, the at least one memory and the computer program code configured to, with the at least one processor, cause the apparatus to perform at least the following: receive information for configuration with Grant-less Uplink Physical Uplink Shared Channel (GUL PUSCH) resources, attempt to transmit Hybrid Automatic Repeat Request (HARQ) feedback on at least one resources, perform a channel access procedure for transmitting Hybrid Automatic Repeat Request Acknowledgement (HARQ-ACK) on the GUL PUSCH resources in response to a determination that the attempting to transmit the HARQ feedback on the at least one resources is unsuccessful, and transmit HARQ-ACK on the GUL PUSCH resources in response to successfully completing the channel access procedure.

In accordance with the example embodiments as described in the paragraphs above, a non-transitory computer program product comprising a computer-readable medium bearing computer program code embodied therein for use with a computer, the computer program code comprising code for receiving, by a user equipment, information for configuration with Grant-less Uplink Physical Uplink Shared Channel (GUL PUSCH) resources, attempting to transmit, by the user equipment, Hybrid Automatic Repeat Request (HARQ) feedback on at least one of implicitly scheduled MulteFire short Physical Uplink Control Channel (MF-sPUCCH) resources, explicitly scheduled MulteFire extended PUCCH (MF-ePUCCH) and explicitly scheduled PUSCH resources, attempting to transmit Hybrid Automatic Repeat Request Acknowledgement (HARQ-ACK) on the GUL PUSCH resources in response to a determination that the attempting to transmit the HARQ feedback on the at least one of the implicitly scheduled MF-sPUCCH resources, the explicitly scheduled MF-ePUCCH and the explicitly scheduled PUSCH resources is unsuccessful, and ending attempts to transmit the HARQ feedback on GUL PUSCH in response to a determination that user equipment has at least one of detected a start of a Downlink burst, and transmitted the HARQ feedback on the GUL PUSCH resources a predefined number of times.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method, comprising:
   receiving, by a user equipment, information for configuration with Grant-less Uplink Physical Uplink Shared Channel (GUL PUSCH) resources;
   attempting to transmit, by the user equipment, Hybrid Automatic Repeat Request (HARQ) feedback on at least one resources;
   performing, after a channel access procedure of the user equipment has blocked transmission of the HARQ feedback on the at least one resources, a channel access procedure for transmitting Hybrid Automatic Repeat Request Acknowledgement (HARQ-ACK) on the GUL PUSCH resources in response to a determination that the attempting to transmit the HARQ feedback on the at least one resources is unsuccessful; and
   transmitting HARQ-ACK on the GUL PUSCH resources in response to successfully completing the channel access procedure for transmitting HARQ-ACK on the GUL PUSCH resources.

2. The method of claim 1, wherein attempting to transmit HARQ feedback further comprises:
   determining whether an Enhanced Node B has triggered transmission of the explicitly scheduled PUSCH resources; and
   only selecting the explicitly scheduled PUSCH resources for transmission of HARQ feedback in response to a determination that the Enhanced Node B has triggered transmission of the explicitly scheduled PUSCH resources.

3. The method of claim 1, wherein performing the channel access procedure for transmitting the HARQ-ACK on the GUL PUSCH resources further comprises:
   performing the channel access procedure for transmitting the HARQ-ACK on the GUL PUSCH resources only within a same eNB-acquired transmission opportunity (TXOP) within which the channel access procedure of the user equipment has blocked transmission on the at least one resources.

4. The method of claim 1, wherein performing the channel access procedure for transmitting the HARQ-ACK on the GUL PUSCH resources further comprises:
   performing the channel access procedure for transmitting the HARQ-ACK on the GUL PUSCH resources in response to a determination that an Enhanced Node B (eNB) has not indicated the at least one resources for HARQ feedback transmission.

5. The method of claim 4, wherein performing the channel access procedure for transmitting the HARQ-ACK on the GUL PUSCH resources further comprises:
   performing the channel access procedure for transmitting the HARQ-ACK on the GUL PUSCH resources only if the eNB has not indicated the at least one resources for HARQ feedback transmission within the eNB-acquired TXOP.

6. The method of claim 1, wherein receiving the information for configuration with the GUL PUSCH resources further comprises:
   receiving the information for configuration of at least one of time domain resources, frequency domain resources, and code domain resources.

7. The method of claim 1, wherein performing the channel access procedure for transmitting the HARQ-ACK on the GUL PUSCH resources further comprises:
   using a same HARQ feedback content determination mechanism regardless of whether the attempted transmission occurs on the GUL PUSCH resource or on the at least one resources.

8. The method of claim 1, wherein performing the channel access procedure for transmitting the HARQ-ACK on the GUL PUSCH resources further comprises:
performing the channel access procedure for transmitting HARQ feedback content determined for a first GUL PUSCH subframe if the user equipment has multiple consecutive GUL PUSCH subframes configured.

9. The method of claim 1, further comprising:
ending performances of the channel access procedure for transmitting the HARQ-ACK on the GUL PUSCH resources in response to a determination that user equipment has at least one of detected a start of a Downlink burst, and transmitted the HARQ feedback on the GUL PUSCH resources a predefined number of times.

10. The method of claim 1, wherein the at least one resources comprises at least one of implicitly scheduled MulteFire short Physical Uplink Control Channel (MF-sPUCCH) resources, explicitly scheduled MulteFire extended PUCCH (MF-ePUCCH) and explicitly scheduled PUSCH resources.

11. An apparatus, comprising:
at least one processor; and
at least one memory including computer program code, the at least one memory and the computer program code configured to, with the at least one processor, cause the apparatus to perform at least the following:
receive information for configuration with Grant-less Uplink Physical Uplink Shared Channel (GUL PUSCH) resources;
attempt to transmit Hybrid Automatic Repeat Request (HARQ) feedback on at least one resources;
perform, after a channel access procedure of the apparatus has blocked transmission of the HARQ feedback on the at least one resources, a channel access procedure for transmitting Hybrid Automatic Repeat Request Acknowledgement (HARQ-ACK) on the GUL PUSCH resources in response to a determination that the attempting to transmit the HARQ feedback on the at least one resources is unsuccessful; and
transmit HARQ-ACK on the GUL PUSCH resources in response to successfully completing the channel access procedure for transmitting HARQ-ACK on the GUL PUSCH resources.

12. The apparatus of claim 11, where, when attempting to transmit HARQ feedback, the at least one memory and the computer program code are configured to, with the at least one processor, cause the apparatus to:
determine whether an Enhanced Node B has triggered transmission of the explicitly scheduled PUSCH resources; and
only select the explicitly scheduled PUSCH resources for transmission of HARQ feedback in response to a determination that the Enhanced Node B has triggered transmission of the explicitly scheduled PUSCH resources.

13. The apparatus of claim 11, where, when performing the channel access procedure for transmitting the HARQ-ACK on the GUL PUSCH resources, the at least one memory and the computer program code are configured to, with the at least one processor, cause the apparatus to:
perform the channel access procedure for transmitting the HARQ-ACK on the GUL PUSCH resources in response to a determination that an Enhanced Node B (eNB) has not indicated resources for HARQ feedback transmission.

14. The apparatus of claim 13, where, when performing the channel access procedure for transmitting the HARQ-ACK on the GUL PUSCH resources, the at least one memory and the computer program code are configured to, with the at least one processor, cause the apparatus to:
perform the channel access procedure for transmitting the HARQ-ACK on the GUL PUSCH resources only if the eNB has not indicated resources for HARQ feedback transmission within the eNB-acquired TXOP.

15. The apparatus of claim 11, where, when receiving information for configuration with the GUL PUSCH resources, the at least one memory and the computer program code are configured to, with the at least one processor, cause the apparatus to:
receive information for configuration of at least one of time domain resources, frequency domain resources, and code domain resources.

16. The apparatus of claim 11, where, when performing the channel access procedure for transmitting the HARQ-ACK on the GUL PUSCH resources, the at least one memory and the computer program code are configured to, with the at least one processor, cause the apparatus to:
use a same HARQ feedback content determination mechanism regardless of whether the attempted transmission occurs on the GUL PUSCH resource or on the at least one resources.

17. The apparatus of claim 11, where, when performing the channel access procedure for transmitting the HARQ-ACK on the GUL PUSCH resources, the at least one memory and the computer program code are configured to, with the at least one processor, cause the apparatus to:
perform the channel access procedure for transmitting HARQ feedback content determined for a first GUL PUSCH subframe if the apparatus has multiple consecutive GUL PUSCH subframes configured.

18. A non-transitory computer program product comprising a computer-readable medium bearing computer program code embodied therein for use with a computer, the computer program code comprising code for:
receiving, by a user equipment, information for configuration with Grant-less Uplink Physical Uplink Shared Channel (GUL PUSCH) resources;
attempting to transmit, by the user equipment, Hybrid Automatic Repeat Request (HARQ) feedback on at least one resources;
performing, after a channel access procedure of the user equipment has blocked transmission of the HARQ feedback on the at least one resources, a channel access procedure for transmitting Hybrid Automatic Repeat Request Acknowledgement (HARQ-ACK) on the GUL PUSCH resources in response to a determination that the attempting to transmit the HARQ feedback on the at least one resources is unsuccessful; and
transmitting HARQ-ACK on the GUL PUSCH resources in response to successfully completing the channel access procedure for transmitting HARQ-ACK on the GUL PUSCH resources.

* * * * *